Nov. 12, 1968 E. S. KELSEY 3,410,964

TWO-WAY LONG DISTANCE VOICE COMMUNICATION SYSTEM WITH SIGNAL LAMPS

Filed July 21, 1965 2 Sheets-Sheet 1

INVENTOR
ERNEST S. KELSEY
BY Curphey + Erickson
PATENT AGENTS

INVENTOR
ERNEST S. KELSEY
BY Curphey + Erickson
PATENT AGENTS

United States Patent Office 3,410,964
Patented Nov. 12, 1968

3,410,964
TWO-WAY LONG DISTANCE VOICE COMMUNICATION SYSTEM WITH SIGNAL LAMPS

Ernest Starkey Kelsey, Ottawa, Ontario, Canada, assignor to Northern Electric Company Limited, Montreal, Quebec, Canada Filed July 21, 1965, Ser. No. 473,745
5 Claims. (Cl. 179—81)

Figure 1:
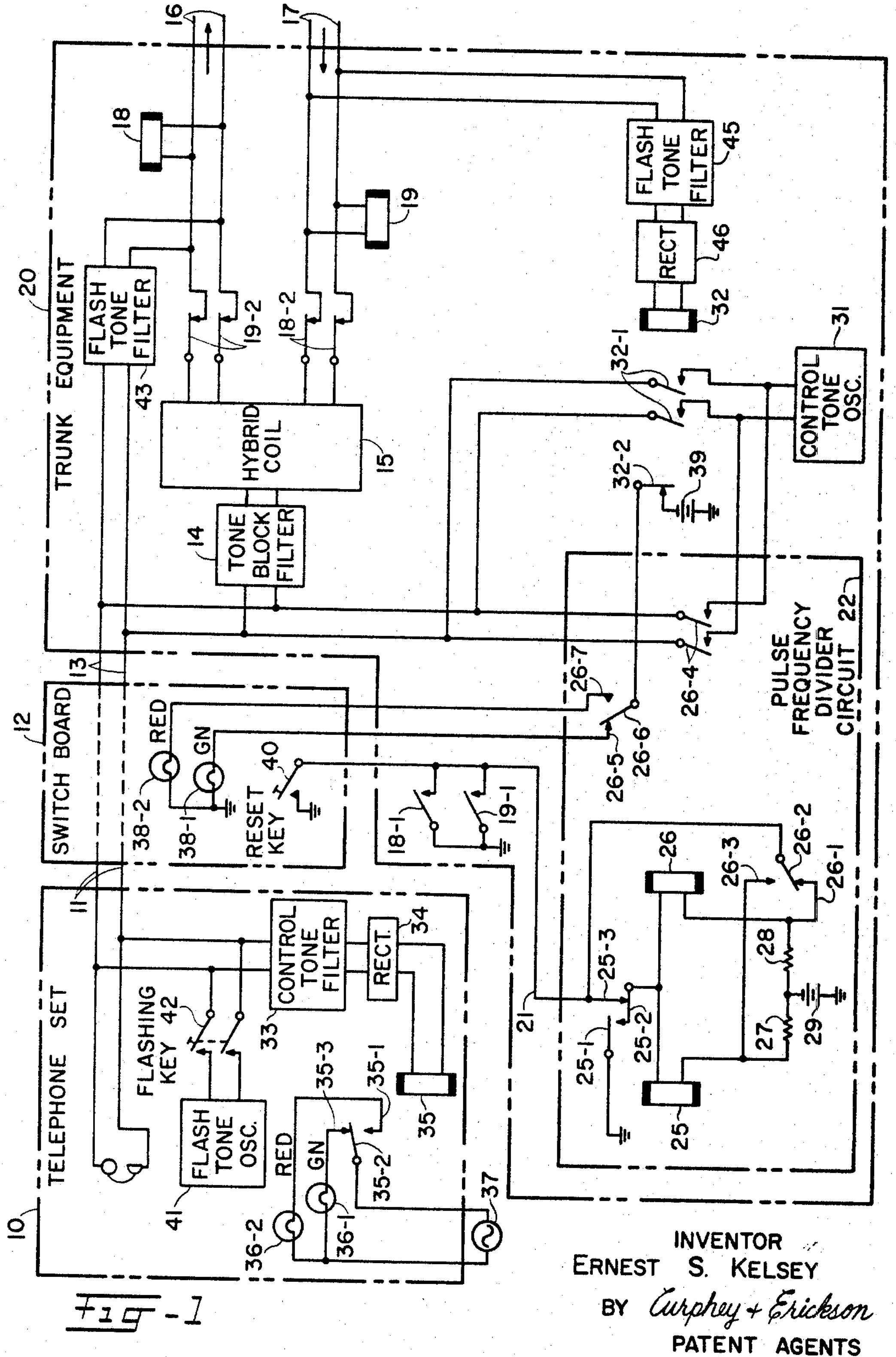

This invention relates to a two-way voice communication system and more particularly to an improvement in such a system for regulating the flow of conversation in each direction. The signalling circuit finds particular application in communication systems having appreciable transmission times such as that encountered in speech communication by satellite relays.

The transmission path, between two parties communicating with each other by telephone, may be either a 2-wire or a 4-wire circuit or a combination of both. In general, the telephone handset at each end of the transmission path is connected to a 2-wire circuit. If however a portion of the path is by radio transmission, as in the case of long distance calls, separate transmission and reception paths are used. Hence, it is necessary to split the 2-wire circuit into a 4-wire circuit. This is generally accomplished by connecting the circuits to a hybrid-coil. However, such a coil is never perfectly balanced and gives rise to leakage between the receiving and transmitting paths of the 4-wire circuit. Thus, some of the energy in the speech signal arriving at the hybrid on the receiving path of the 4-wire circuit will be coupled to the transmitting path through the hybrid-coil and returned to the sending end as an echo. When these echos return to the sending end with a small time delay, they do not prove to be objectionable.

When longer transmission time delays exist on the path, the resulting long-delayed echoes are far more annoying to a talker. To overcome this problem, echo suppressors have been used which upon sensing the presence of speech transmission in the transmitting path of a 4-wire circuit, inserted a large loss in the receiving path at the same end. This substantially limits the speech transmission to either one direction or the other thereby preventing leakage signals across the hybrid-coil from returning to the sending end.

When the transmission time delay of a circuit exceeds a value of about 250 ms., as can be expected with satellite relays, another type of interference to telephone conversation becomes troublesome. This additional hindrance to effective conversation cannot be overcome by the use of echo suppressors. It is the result of the longer than normal time interval during which each party must wait after he stops speaking before receiving a reply. The additional waiting time includes the transmission time required for the words to travel to the distant listener and the time required for the listener's reply to traverse the return path to the first speaker. With a one-way transmission time of 250 ms., the total transmission delay will increase the waiting time by a half second.

These unusually long waiting intervals in the to-and-from flow of a conversation are likely to induce either party to begin speaking again before hearing from the other party, only to find himself interrupted by the reply that was in transit. Similarly, the distant party will be confused by the arrival of the supplementary remark while he is replying, or after he has replied, to the earlier remark. Under these conditions both parties will be uncertain whether to speak or to wait for the other party to speak. One or both parties will most likely be speaking at the same time or waiting for the other to speak. Evidently similar confusion can be initiated by the long transmission time delay when one party attempts to interrupt the other.

An operational procedure which can be used to overcome this difficulty is that used with "press to talk" radio circuits. On these circuits a switch is associated with each telephone set which must be operated while talking; the function of the switch being to connect the radio transmitter when the switch is operated and the radio receiver when it is released. Each party advises the other when he has finished speaking and wishes to change over to the opposite direction of transmission, the usual code word being "over". This system, while solving the problem, does not lend itself to regular voice communication by telephone since it involves the introduction and use of awkward switching by the two parties.

It has been discovered that these difficulties may be overcome by providing a visual signalling means for a two-way voice communication system for controlling the direction of speech flow; the signalling means at each station being controlled, in turn, by the transmitted and received voice signals at the same station. In its broad concept, the invention comprises at each station a means for generating a signal pulse in response to voice signals being transmitted from it; a means for generating a signal pulse in response to voice signals being received by it; and a pulse frequency divider circuit which is adapted to alternately activate and deactivate a visual indicating device in response to the termination of signal pulses from the generating means.

In a preferred embodiment, each pulse generating means comprises a voice operated relay connected in shunt with either the transmission path or the reception path. Each voice operated relay has associated with it a pair of make contacts which are connected in parallel with each other across the input of the pulse frequency divider circuit. Upon cessation of the received signals from the distant station, the relay associated with the reception path will release thereby opening the make contacts connected to the input of the pulse frequency divider circuit. The divider circuit in turn controls the application of a source of voltage across the visual indicating device, which may be a lamp, thereby indicating that the circuit is ready for speech transmission. Having received a go ahead, the party at the near station will convey his message in the usual manner. At the completion of the transmitted signal from the near station, the relay associated with the transmission path will release and thereby cause the indicating device or lamp to extinguish. The lamp will remain out until after the reception of a speech signal from the distant station as hereinbefore explained; whereupon it will relight thus indicating that the speech path is again clear.

The invention may also include, at each station, a control tone oscillator, the output of which is controlled by the pulse frequency divider circuit; and a relay control circuit adapted to be responsive to the output of the control tone oscillator; the relay control circuit in turn actuates the indicating lamp. This allows the pulse frequency divider circuit to be located adjacent to trunk equipment in a central office and the indicating lamp adjacent to a telephone handset which may be at a remote location from the trunk equipment. If the control tone oscillator frequency is out of hand, the indicating lamp can then be controlled from the trunk equipment over the same pair of wires which carries the voice signal from the trunk equipment to the handset.

In a still more preferred embodiment the indicating light is coloured green and each station includes a second light coloured red which is turned on by the relay control circuit whenever the green lamp is off. In this way, the green light indicates that the circuit is clear for speech transmission and the red light indicates that having finished speaking, the local party must now await a reply from the distant party.

Opposite signals are required at the two terminals, of course, so that when the signals indicate transmission from the near to the distant station, the signal at the near station will be green and at the distant end, red; and conversely. In order to initiate conversation in one direction when the connection is first set up, a preferred embodiment of the invention includes a switch associated with the switchboard termination of the trunk at each end, by means of which the signals for transmission in one direction can be set when the connection is first set up. For example, if a party at A is requesting a connection to a party at B, the conversation should be initiated with A's signal set for green and B's signal, red.

The pulse frequency divider circuit may be of any well-known type. In a preferred embodiment however, the circuit is the same as that described in FIGURE 11–4 in the text "The Design of Switching Circuits," by Keister, Ritchie and Washburn; D. Van Nostrand Company, Inc., at pages 242–243.

The invention may also comprise an additional signalling means at each station whereby the party is provided with a push-button which when operated flashes the lights at the distant party's station. This will permit either party to signal the other should he wish to speak out of turn, that is, while his light is red.

Figure 2:
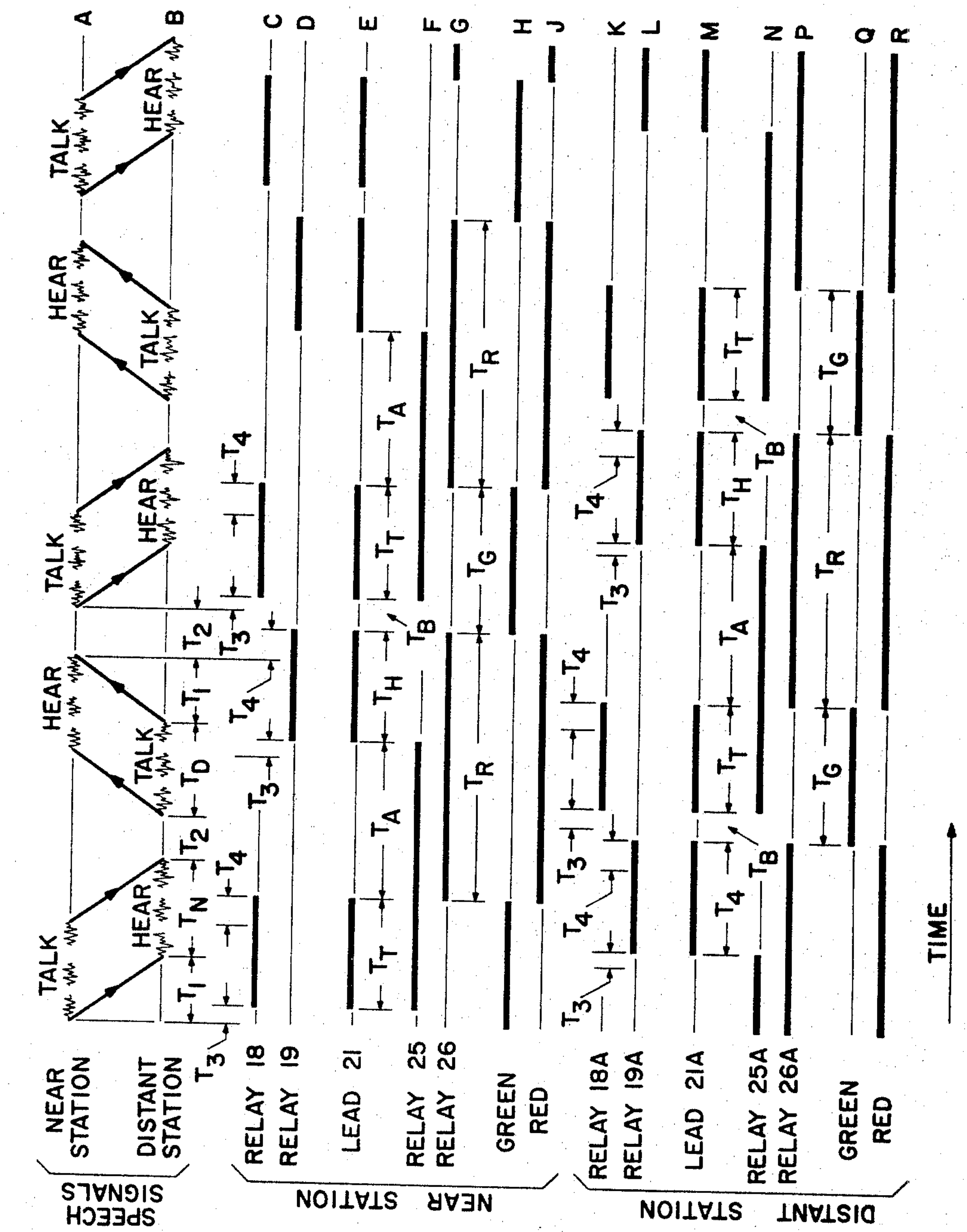

A preferred embodiment of the invention will now be described with reference to the accompanying drawings in which:

FIGURE 1 is a block and schematic circuit diagram of a signalling circuit for a two-way voice communication system in accordance with the present invention; and FIGURE 2 is a graph illustrating the sequence and timing operation of various components forming part of the signalling circuit illustrated in FIGURE 1.

The following description will illustrate the circuitry at only one of the pair of stations in the two-way voice communication system. It will be understood however, that the circuitry is duplicated at the distant station. Whenever reference is made to any of the elements at the distant station, the reference numeral will be followed by the letter "*a*."

Referring now to FIGURE 1, each station of the two-way communication system comprises a telephone set 10 which is connected through a 2-wire circuit 11 to a switchboard 12. A two-wire circuit 13 from the switchboard 12 is connected through a tone blocking filter 14 to the 2-wire side of a hybrid coil 15, both forming part of trunk equipment 20. On one 4-wire side, the hybrid coil 15 is connected by a transmission path 16 and a reception path 17 to the reception path **17*a* and the transmission path 16*a* respectively, of trunk equipment 20*a*** at the distant station. The intervening two-way transmission path may include telephone toll lines, terrestrial radio relay links and/or one or more communication satellite links.

A voice operated relay coil 18 is connected in shunt with the transmission path 16 while a similar relay coil 19 is connected in shunt with the reception path 17. Each of the coils 18 and 19 have associated therewith a pair of make contacts 18–1 and 19–1 respectively.

The make contacts 18–1 and 19–1 are connected in shunt with each other between ground and an input lead 21 to a pulse frequency divider circuit 22. Also associated with the relay 18 are a pair of break contacts 18–2 connected in series with the reception path 17 between the hybrid coil 15 and the relay 19. Similarly, associated with the relay 19 are a pair of break contacts 19–2 connected in series with the transmission path 16 between the hybrid coil 15 and the relay 18.

The pulse frequency divider circuit 22 comprises a make-break continuity transfer relay having a relay coil 25, a set of make contacts 25–1 and 25–2 and a set of break contacts 25–2 and 25–3. The pulse frequency divider circuit 23 also includes a break-make transfer relay 26 having associated therewith a set of break contacts 26–1 and 26–2, and a set of make contacts 26–2 and 26–3. A pair of resistors 27 and 28 are connected in series between one of the ends of each of the relay coils 25 and 26. The other ends of the coils 25 and 26 are connected together and also to the contact 25–2. The junction of the two resistors 27 and 28 is connected to one terminal of a source of voltage 29. The other terminal of the source of voltage 29 and contact 25–1 are connected to ground. The contacts 25–3 and 26–2 are connected together and to the input lead 21. The contact 26–1 is connected to the junction of the relay coil 26 and the resistor 28; while the contact 26–3 is connected to the junction of the relay coil 25 and the resistor 27.

The communication system also comprises a control tone oscillator 31 which is connected to the 2-wire transmission line 13 through either a double set of make-contacts 26–4 associated with relay 26, or a double set of make contacts 32–1 of a relay 32. The frequency of the oscillator 31 is out of hand, being preferably ultrasonic.

A control tone filter 33 in the telephone set 10 is bridged across telephone line 11; the output of this filter 33 is connected through a rectifier 34 to a relay coil 35. Relay contacts 35–1 and 35–3 are connected to green and red lamps 36–1 and 36–2 respectively. A transfer contact 35–2 and the other side of the lamps 36–1 and 36–2 are connected across a source of alternating voltage 37.

Green and red signal lamps 38–1 and 38–2 at the switchboard 12 are connected to contacts 26–5 and 26–7, respectively, of the relay 26. A transfer contact 26–6 is connected through contacts 32–2 of the relay 32 to a direct current voltage source 39. A signal reset key 40 at the switchboard 12 connects ground, when operated, to the input lead 21 of the pulse-divider circuit 22.

Speech signals originating from the telephone set 10 are transmitted over the telephone line 11, through the switchboard 12 and the tone blocking filter 14, through the hybrid coil 15 to the transmission path 16. If the system utilizes satellite repeater stations, the transmission path will be up to the satellite repeater and down to a distant earth terminal. Upon arriving at the far station, the signal will pass from the reception path **17*a*, through the hybrid coil 15*a*, the tone blocking filter 14*a* and the switchboard 12*a*, to the far end telephone set 10*a***.

At each station the relay coils 18 and 19 are designed to be of a high impedance type and to operate on voice frequency currents. They have a fast pull-in time but a slow release time so that they will remain operated during signal breaks between words and sentences.

During each interval of transmitted speech the operated contacts 18–2 of the relay 18 open the reception path 17 and the operated contacts 18–1 connect ground to the pulse divider circuit input leads 21. Similarly, during each interval of received speech the operated contacts 19–2 of the relay 19 open the transmission path 16, while the operated contacts 19–1 connect ground to lead 21.

The invention may also comprise a flash-tone oscillator 41, the frequency of which is different from that of the control tone oscillator 31 so that interference between the two signals can be avoided by means of filters. The flash-tone is connected to the circuit 11 by means of a flashing key 42. A flash-tone filter 43 in the trunk equipment 20 provides a bypass, for this tone only, around the hybrid coil 15 to the transmitting path 16. The flash-tone signal is received on the reception path 17 where it is connected to a flash-tone pass filter 45 which directs the received tone through a rectifier 46 to the relay 32 causing it to alternately operate and release at the flashing frequency. The contacts 32–2 cause switchboard control lamp 38–1 to flash on and off. At the same time the 32–1 connects the tone contacts from the control-tone oscillator 31 to the line 13 in pulses at the flashing frequency, causing the red and green lamps 36–1 and 36–2 to flash giving alternate red and green signals. When the party who has been talking sees his control signals flash and stops talking, the party originating the flashing signal will see his own control signal, which has been red, switch to green. He will then release his flashing key to stop the flashing signals.

The signals at the interrupted station will stop flashing with the green signal extinguished and the red signal lit so that the interrupting party will now have the green signal to go ahead and the interrupted party the red signal to await the voice of the interrupting party.

FIGURE 2 illustrates a typical time sequence operation of some of the components illustrated in FIGURE 1.

Lines A and B illustrate graphically a succession of speech signals transmitted alternately from one station to the other and also the other way. The time interval $T_1$ is the transmission time required for transmission of the speech signals in each direction. The durations of each voice transmission $T_N$ and $T_D$ although shown the same, for convenience, will in practice be of indefinite length as determined by each speaker. Similarly, the time intervals that elapse after each party has heard voice transmission from the distant party end, until he begins to reply will be determined by the party whose turn it is to speak, but is shown for convenience as a fixed length $T_2$.

On lines C and D are shown the operated intervals of the voice operated relays 18 and 19 at the near station. The beginning and ending of each operated interval is delayed by the operating and release times $T_3$ and $T_4$ respectively of the relays 18 and 19. The release time $T_4$ is made sufficiently large that there will be no break in the operated interval due to momentary pauses between words and phrases of the speaker. Line E illustrates the resulting ground pulses on the lead 21. Lines F and G show the operated intervals of the relays 25 and 26 of the pulse-divider circuit 22. The operating and release times of these relays 25 and 26 are assumed to be sufficiently short to be negligible. Lines H and J show the time intervals during which the green and red signal lamps 36–1, 38–1, and 36–2, 38–2, are lighted as a result of the release and operation respectively of relay 26. The corresponding time intervals of the circuit components at the far terminal are shown on lines K to R. The following relations can be seen to exist between the time intervals applied to, and received from the pulse-dividing circuit at the west terminal.

Time intervals—line E $$T_T=T_N+(T_4-T_3)$$
$$T_H=T_D+(T_4-T_3)$$
$$T_A=T_2+2T_1-(T_4-T_3)$$
$$T_B=T_2-(T_4-T_3)$$

Time intervals—line G $$T_R=T_D+T_2+2T_1=T_H+T_A$$
$$T_G=T_N+T_2=T_T+T_B$$

where:

$T_1$ is the transmission time delay interval between the two stations;

$T_2$ is the elapsed time which a party waits before commencing his reply (shown for convenience as a fixed length);

$T_3$ is the operating time delay interval of the relays 18 and 19;

$T_4$ is the release time delay interval of the relays 18 and 19;

$T_N$ is the length of the speech interval of the near end talker;

$T_D$ is the length of the speech interval of the distant end talker;

$T_T$ is the time interval that the lead 21 is grounded due to the operation of the relay 18;

$T_H$ is the time interval that the lead 21 is grounded due to the operation of the relay 19;

$T_A$ is the time interval between $T_T$ and $T_H$;

$T_B$ is the time interval between $T_H$ and $T_T$;

$T_R$ is the time interval that the red lamps are lit; and $T_G$ is the time interval that the green lamps are lit.

At the east terminal the time intervals will be similar with the green and red lamps **36–1*a* and 38–1*a*, and 36–2*a* and 38–2*a*** being interchanged. It will be noted that the red signal at one terminal includes the same time interval as the green signal at the other terminal but begins earlier and ends later by the transmission time interval $T_1$.

The operation of the system will now be described with the initial operating conditions being that both the relays 25 and 26 are de-energized at the near station, while the relays **25*a* and 26*a* are operated at the far station. Under these conditions green lamps 36–1 and 38–1 will be lit at the near station. Since the relay 26*a* is operated at the far station, the red lamp 38–2*a* will be lit and the control tone oscillator 21*a* will be connected to the telephone line 13*a* causing the operation of relay 35*a* and the lighting of red lamp 36–2*a***.

The party at the near station having the green signal to begin talking does so, causing the relay 18 to operate. The relay 18 opens the reception path 17 and connects ground to pulse input lead 21, which causes the relay 25 to operate through contacts 25–2 and 25–3, and to lock in its operated connection through contacts 25–1 and 25–2. At the distant station the relay **19*a* will operate after transmission time delay $T_1$, which connects ground to lead 21*a* and opens the transmission path 16*a*. Connection of ground to the lead 21*a* causes the relay 25*a* to release by connecting ground to the junction of the relay coil 25*a* and the resistor 27*a* through the contacts 26–2*a* and 26–3*a***.

When the party at the near station stops talking, the relay 18 at the near end releases and the relay **19*a* at the distant end releases after the transmission time delay $T_1$. At the near end removal of ground from lead 21 by release of relay 18, permits the relay 26 to operate resulting in the green lamps 36–1 and 38–1 being extinguished and the red lamps 36–2 and 38–2 lighting. At the distant end the release of the relay 19*a* removes ground from lead 21*a* causing the relay 26*a* to release which, in turn, causes the red lamps 36–2*a* and 38–2*a* to be extinguished and green lamps 36–1*a* and 38–1*a*** to light.

On seeing the green light at the distant end the distant party will begin talking causing relay **18*a* to operate and, after a time delay $T_1$, causing the relay 19 at the near end to operate. The operation of the relay 18*a* connects ground to the lead 21*a* causing the relay 25*a* to operate and lock up through the contacts 25–2 and 25–1. At the near end the operation of the relay 19 connects ground to lead 21. This ground is applied through the operated contacts 26–2 and 26–3 of the relay 26 to the winding of the relay 25 causing it to release. The circuit holding the relay 26 operated now finds its ground on lead 21 instead of through the contacts 25–1 and 25–2**.

When the distant party stops talking the relay **18*a* releases and, after transmission delay interval $T_1$, the relay 19 at the near end releases. The release of relay 18*a* removes ground from the lead 21*a*. This removes ground from the connection through relay contacts 26–1*a* and 26–2*a* to the winding of relay 26*a*. This relay 26*a* now operates to the ground through the operated contacts 25–2*a* and 25–1*a* of relay 25*a*. With the relay 26*a* operated, a circuit is closed through its contacts 26–4*a* and the contact 26–6 are transferred to contact 26–7, thereby causing the green lamps 36–1*a* and 38–1*a* to be extinguished and red lamps 36–2*a* and 38–2*a* to light. At the near end, release of the relay 19 removes ground from the lead 21 causing the relay 26 to release. The release of this relay 26 causes the red lamps 36–2 and 38–2 to be extinguished and green lamp 36–1 and 38–1** to be lighted. This completes one cycle and begins a second cycle of the conversation.

At each station, when the switchboard operator is setting up the connection, she can set the conversation control signals at her end to red or green, as desired, by means of reset key 40. If her control signal is green, operation of her key 40 causes the relay 25 to operate and lock up. When the key is released, the relay 26 operates switching the control signal from green to red. Conversely, if the signal is red, the relays 25, 26 will both be in their operated positions and in this case, when the reset key 40 is operated, ground over lead 21 causes the relay 25 to release and when the key 40 is released the relay 26 releases causing the control signal to switch from red to green.

The preferred operating procedure is for the operator at the terminal originating the call to set her signal at green and the operator at the terminal being called to set her control signal at red so that when the connection is cut through to the two parties the one originating the call will have the green signal to begin the conversation and the called party will be faced by the red signal until the calling party stops speaking. It will be noted that while either operator is disconnected from the trunk 13 and is talking to the calling or called party, as the case may be, there will be no control tone on the line 11 so that the control signal at the telephone set 10 will be green.

The embodiments of the invention in which an exclusive property or privilege is claimed are defined as follows:

1. In a two-way voice communication system having a pair of stations, each station having a transmission path for transmitting voice signals and a reception path for receiving voice signal transmitted from the opposite station; the improvement at each station comprising: a first generating means for generating a first signal pulse in response to voice signal currents in the transmission path; a second generating means for generating a second signal pulse in response to voice signal currents in the reception path; pulse frequency divider means having an input and an output, said pulse frequency divider means arranged to produce a signal at said output for alternately activating and deactivating a visual signalling device in response to the termination of successive pulses received at said input from said generating means.

2. A two-way voice communication system having a pair of stations; each station comprising a transmission path for transmitting voice signals; a reception path for receiving the voice transmitted from the opposite station; pulse frequency divider means having an input and an output, a first voice operated relay connected in shunt with the transmission path; a second voice operated relay connected in shunt with the reception path; each of said relays having a pair of contacts associated therewith; said contacts being connected to said input to the pulse frequency divider means for operation thereof said pulse frequency divider means arranged to produce a signal at said output for alternately activating and deactivating a lamp in response to the release of said voice operated relays in the reception path and the transmission path.

3. A two-way voice communication system as defined in claim 2 which further comprises at each station, a telephone set connected by a two-wire path to said transmission path and said reception path; a control tone oscillator connected by said pulse frequency divider circuit to said two-wire path; and means for actuating said lamp in response to the receipt of the signal from the control tone oscillator.

4. A two-way voice communication system as defined in claim 3 which additionally comprises at each station: a flash tone oscillator and key adapted to transmit intermittent signals; and a flash tone signal sensitive relay circuit connected in shunt with the reception path and responsive only to said intermittent signals transmitted from the opposite station, said signal sensitive relay having associated therewith means for connecting the control tone oscillator to said two-wire path.

5. A two-way voice communication system as defined in claim 4 which additionally comprises a reset key connected to the input to the pulse frequency divider means, so that manual operation of said reset key will alternately activate and deactivate the lamp at the adjacent station only.

References Cited

UNITED STATES PATENTS

| | | | |
|---|---|---|---|
| 2,472,585 | 6/1949 | Hailes | 325—21 XR |
| 3,370,294 | 2/1968 | Kahn | 325—52 XR |

KATHLEEN H. CLAFFY, *Primary Examiner.*

R. LINN, *Assistant Examiner.*